May 9, 1967 W. W. COVILLE 3,318,640
PNEUMATIC SHEET HANDLING APPARATUS AND METHOD OF MAKING SAME
Filed April 23, 1965 4 Sheets-Sheet 1
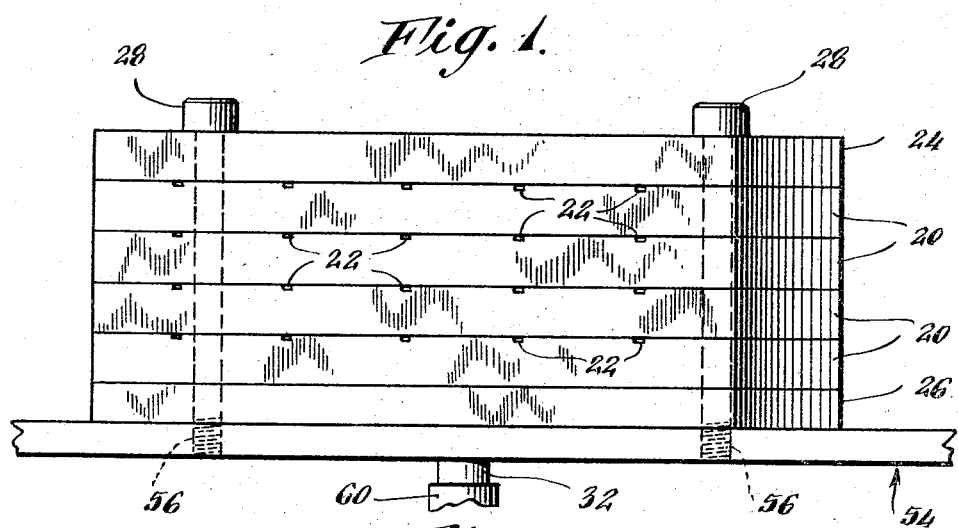
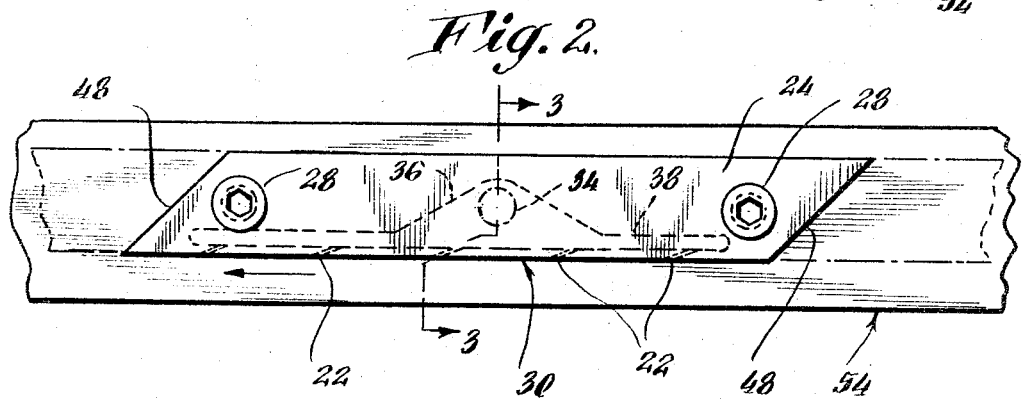
INVENTOR.
William W. Coville
BY
Blair & Buckles
ATTORNEYS.

May 9, 1967 W. W. COVILLE 3,318,640
PNEUMATIC SHEET HANDLING APPARATUS AND METHOD OF MAKING SAME
Filed April 23, 1965 4 Sheets-Sheet 2
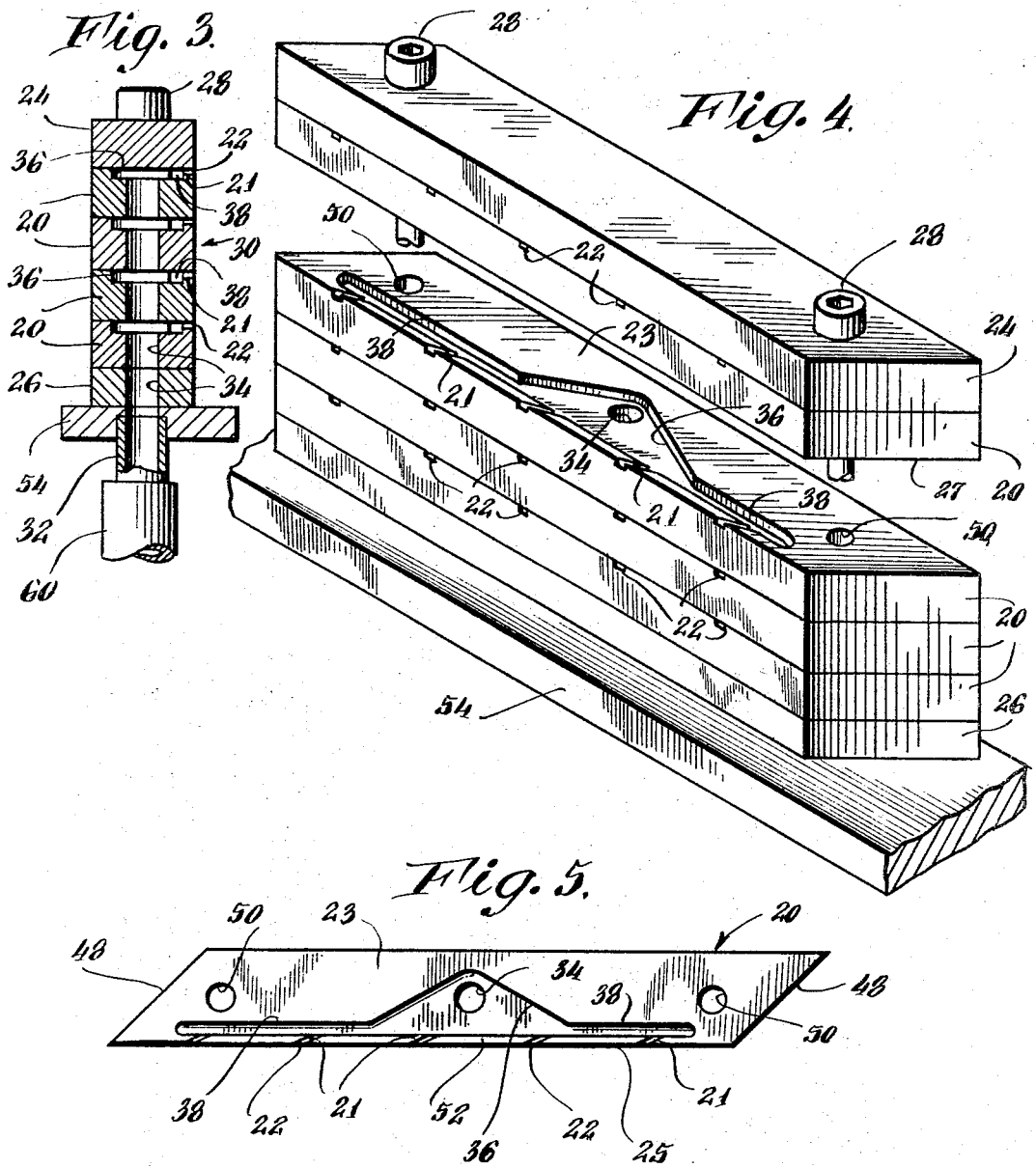
INVENTOR.
William W. Coville
BY
Blair & Buckles
ATTORNEYS

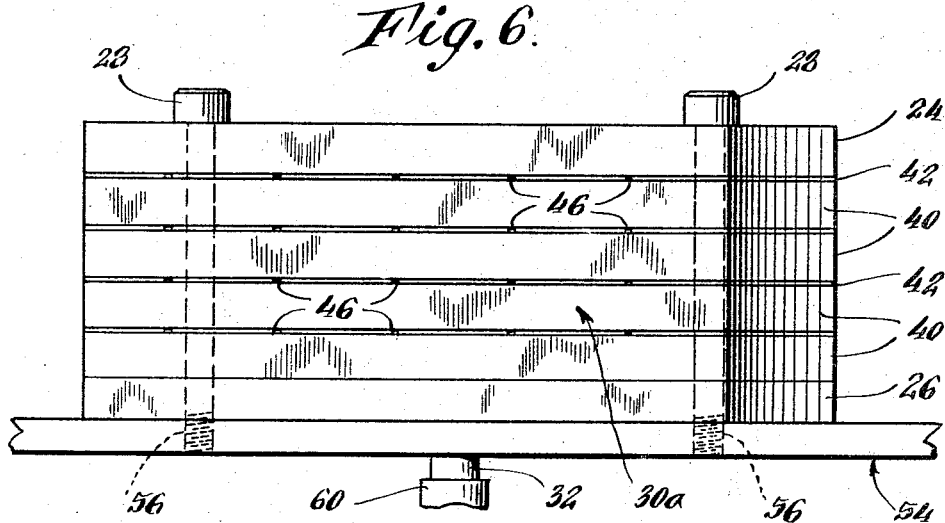
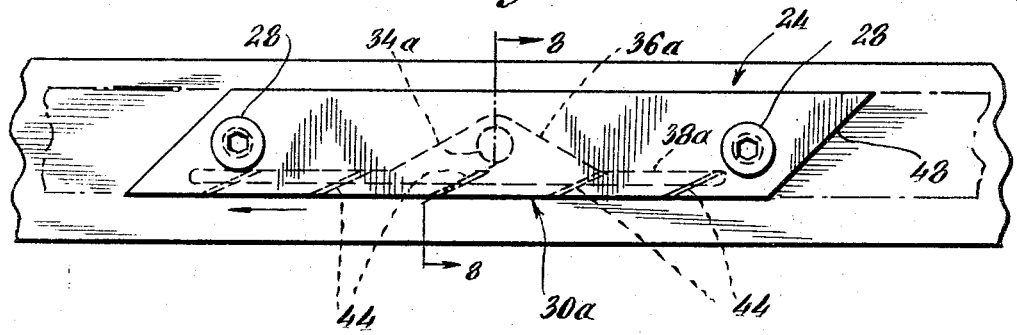

May 9, 1967  W. W. COVILLE  3,318,640
PNEUMATIC SHEET HANDLING APPARATUS AND METHOD OF MAKING SAME
Filed April 23, 1965  4 Sheets-Sheet 4
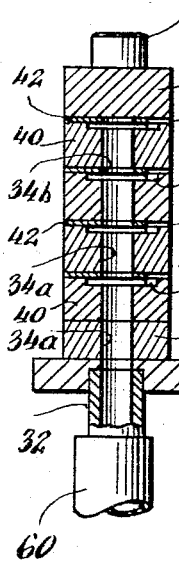
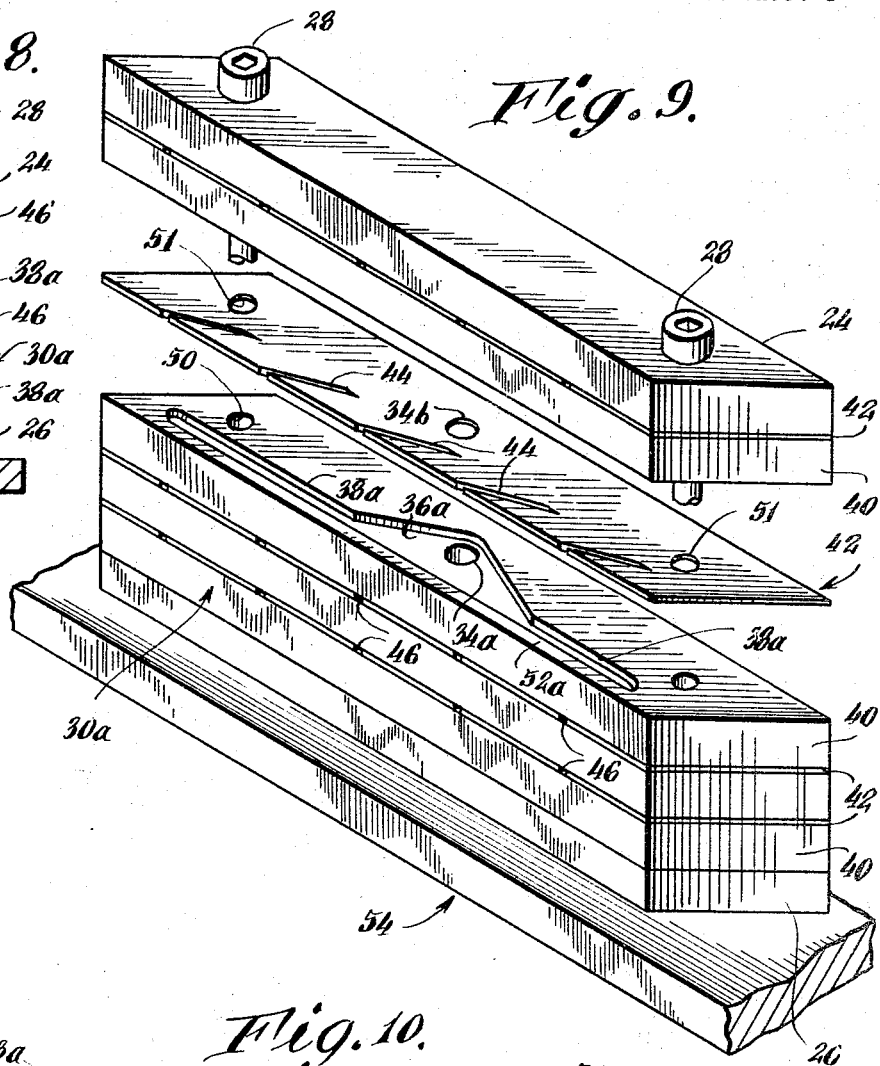
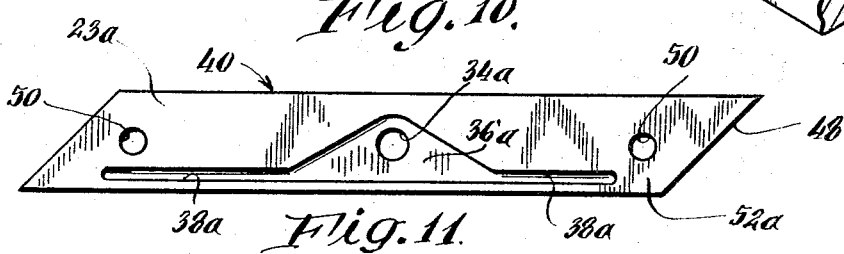
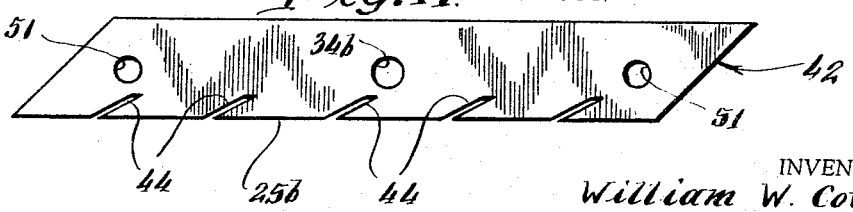
INVENTOR.
William W. Coville
BY
Blair & Buckles
ATTORNEYS.

United States Patent Office 3,318,640
Patented May 9, 1967

3,318,640
PNEUMATIC SHEET HANDLING APPARATUS
AND METHOD OF MAKING SAME
William W. Coville, Stamford, Conn., assignor to Pitney-Bowes, Inc., Stamford, Conn., a corporation of Delaware
Filed Apr. 23, 1965, Ser. No. 450,436
7 Claims. (Cl. 302—31)

This invention relates to pneumatic sheet handling apparatus having a plurality of air outlets from a manifold and to the method of fabricating and assembling such apparatus. More particularly, the apparatus comprises a plurality of laminations which formed spaced air outlets and air manifolds when the laminations are secured together. The method relates to the forming of the laminations, the air outlets and the manifolds and to the assembly of the laminations into the apparatus.

The pneumatic handling of sheet material such as a paper document or card has been employed in a number of applications, as disclosed in U.S. Patent No. 3,136,539 for example. In general, such applications provide for a relatively thin layer of moving air between the sheet and a track or guiding surface. An air bearing effect is thus provided which facilitates movement of a sheet over the guide or track. For moving the sheet, the air is directed and moved between the sheet and guide surface, creating differential air pressure on the outside of the sheet to urge the sheet toward the guide surface as it is moved. The moving air between the sheet and guide surface thus drives the sheet along the guide surface on an air bearing with the sheet being held relatively close to the guide surface by the differential air pressure effect.

To provide a moving air stream between the guide surface and sheet, a plurality of air outlets on the guide surface is generally employed with a substantial number of spaced air outlets of small diameter being preferred for economy of air supply. To give direction to the air flow from the air outlets, the outlets should have substantial length. This has been accomplished by forming each air outlet out of a separate tube or by drilling through a relatively thick plate which also serves as the guide surface.

Prior art approaches to making such apparatus with directed air outlets have included the securing of pneumatic fittings to the back of the guide surface at the desired angle. The air outlets are drilled into the front of the guide surface at the fitting terminations. Flexible hose or tubing is connected to the fittings to supply air through the air outlets. The manufacture of such pneumatic sheet handling apparatus requires individual drilling and installation of the air outlets and the securing of each tubular air fitting. Thus such a manufacturing process is quite time consuming and expensive. It has also been found that with such a great number of air connections and tubing there are attendant problems of leakage which add to the cost of operation.

Another approach has been to provide a guide plate for the sheet handling unit which has substantial thickness to provide for air outlets having sufficient length to give the proper air flow direction. The outlets are formed through the guide at the proper angle, terminating at air connections on the back portion of the plate. Thus, the air outlets may be formed by drilling through the relatively thick guide plate but the cost when employing such a method is prohibitive. It has been found that the air outlets should be very small, i.e., less than .003 square inch in cross-sectional area, and should be disposed at an angle of preferably less than 30° with respect to the guide surface. As will be readily appreciated, the drilling of such small holes at the required angle in a relatively thick guide plate is a very expensive and time consuming process.

It was found that with an effective .0004 square inch cross-sectional area for the air outlets, drilling was an extremely delicate and expensive operation. Punching or stamping of the air outlets has also been suggested, but because of the very small size and angular disposition of the air outlets and the guide plate thickness, such operations are also difficult.

Accordingly, it is an object of this invention to provide pneumatic sheet handling apparatus comprising a sheet guide having a plurality of directed air outlets therein.

Another object of the invention is to provide pneumatic sheet handling apparatus of the above character wherein the air outlets are supplied by an air manifold.

A further object of the invention is to provide pneumatic sheet handling apparatus of the above character which is relatively inexpensive to manufacture, assemble and operate.

Another object of the invention is to provide pneumatic sheet handling apparatus of the above character which is formed by a plurality of secured laminations.

A further object of the invention is to provide pneumatic sheet handling apparatus of the above character wherein the air outlets and manifolds are formed in the laminations by inexpensive stamping or cutting operations.

Another object of the invention is to provide methods for fabricating and assembling pneumatic sheet handling apparatus of the above character.

Other objects of the invention will in part be obvious and will in part appear hereinafter.

The invention accordingly comprises the several steps and the relation of one or more of such steps with respect to each of the others and the apparatus embodying features of construction, combinations of elements and arrangement of parts which are adapted to effect such steps, all as exemplified in the following detailed disclosure, and the scope of the invention will be indicated in the claims.

For a better understanding of the nature and objects of the invention, reference should be had to the following detailed description taken in connection with the accompanying drawings in which:

FIGURE 1 is a side view of a pneumatic sheet handling unit according to my invention;

FIGURE 2 is a top view of the pneumatic sheet handling unit shown in FIGURE 1;

FIGURE 3 is an end view in partial section taken along line 3—3 of FIGURE 2 and looking in the direction of the arrows;

FIGURE 4 is a partially exploded perspective view of the pneumatic sheet handling unit of FIGURE 1;

FIGURE 5 is a top view of a lamination section of the pneumatic sheet handling unit of FIGURE 1;

FIGURE 6 is a side view of another embodiment of my pneumatic sheet handling unit in accordance with my invention;

FIGURE 7 is a top view of the pneumatic sheet handling unit shown in FIGURE 6;

FIGURE 8 is an end view in partial section taken along line 8—8 of FIGURE 7 and looking in the direction of the arrows;

FIGURE 9 is a partially exploded view of the pneumatic sheet handling unit shown in FIGURE 6;

FIGURE 10 is a top view of a lamination section for the pneumatic sheet handling unit shown in FIGURE 6; and FIGURE 11 is a top view of a slotted lamination shim for the pneumatic sheet handling unit shown in FIGURE 6.

Like reference characters denote like parts throughout the several views of the drawings.

I have found that in making my pneumatic air handling unit from a series of laminations which provide air manifolds and air outlets when assembled, the cost of manufacture is greatly reduced. By forming the air outlets into a side of a lamination or by slotting thin shim laminations, drilling of the small air outlets is eliminated. Further, the laminated pneumatic sheet handling apparatus of my invention can be readily assembled or disassembled for cleaning. Being made from a pluarity of laminations, my sheet handling apparatus also provides a great degree of flexibility with regard to the size of each unit and the spacing of the air outlets on the unit.

Referring now to FIGURES 1–5, the invention will be generally described. A series of lamination sections 20 having air outlet grooves 21 formed in a side thereof are secured together with end lamination 24 and spacer lamination 26 by bolts 28 to provide a pneumatic sheet handling unit having a number of air outlets 22 on the sheet handling guide surface 30. Air outlet grooves 21 are formed at an angle in the securable side 23 of the laminations 20 and terminate on the guide edge 25 of each lamination 20 to form air outlets 22 between the assembled laminations.

An air supply fitting 32 is in communication with aligned air supply passages 34 which are provided through the laminations 20 and 26. As best seen in FIGURE 3, end lamination 24 does not have an air passage and accordingly, closes off the adjacent lamination section 20 when the unit is assembled.

As best seen in FIGURES 4 and 5, each of the laminations 20 has a manifold 36 in the form of a shallow depression formed in a side of the lamination. The manifold 36 is in fluid communication with air passage 34 and is extended along the lamination side by means of manifold channels 38 to communicate with the air outlet grooves 21.

End lamination section 24 is identical in outline with lamination sections 20 and has only bolt holes 50 through its ends. End lamination section 24 thus serves as a closure for its adjacent lamination 20 upon assembly, closing off the manifold and the open side of the adjacent air outlet grooves 21 as shown in FIGURES 1 and 3. Spacer lamination 26 is identical with end lamination 24 except for the formation of the air passage 34 therethrough for communication with the air passages 34 in the laminations 20.

Upon assembly, the laminations 20 are positioned with the air outlet grooves 21 adjacent the flat securable side 27 of the next succeeding lamination. Thus, the grooves 21 and smooth side 27 of the adjacent lamination form the directed air outlets in guide surface 30. The air passage and manifold arrangement in each of the laminations 20 requires only a single air supply fitting 32 to supply air through all of the air outlets.

Referring now to FIGURES 6–11, another embodiment of my invention will be generally described. In this embodiment the lamination sections 40 contain aligned air passages 34a, manifold depressions 36a and manifold channels 38a which are similar to the air passage and manifold structure shown in FIGURES 4 and 5. Air outlet grooves however, are not cut into the side of the lamination containing the air manifold. The air outlets 46 instead are formed by a number of thin slotted laminations or shims 42 alternately interposed between the laminations 40. As best seen in FIGURES 9 and 11, the shim laminations 42 are provided with angled slots 44 along one edge. These slots are in communication with the manifolds and form the air outlets when the laminations 40 containing the manifolds 36a, 38a, are assembled with a slotted shim lamination 42 therebetween as shown in FIGURE 6. As in the embodiment shown in FIGURE 1, end closure lamination 24 and spacer lamination 26 may be identical.

An air supply fitting 32 is connected to supply air to the manifolds 36a, 38a through air passages 34a in the laminations 26, 40 and through air passages 34b in the lamination shims 42. Upon assembly of the laminations and shims, as shown in FIGURE 6, a plurality of air outlets 46 is thus formed on the guide surface 30a of the pneumatic sheet handling unit. Air introduced into the unit through fitting 32 will pass through spacer lamination 26 and to each of the manifolds 36a, 38a through the air passages 34a and 34b to be distributed through the slots 44 to air outlets 46.

Both embodiments of the invention can be manufactured and assembled with great facility and at a greatly reduced cost over drilling operations for forming the air outlets. The air outlet grooves 21 in the embodiment shown in FIGURE 1 can be formed by simple milling operations for example. The air outlet slots 44 shown in the embodiment of FIGURE 6 can be readily formed by an inexpensive stamping operation, which may comprise a single step in making the thin shim laminations 42. The cross-sectional area of the air outlets is determined by the width and depth of the angled grooves 21 in the FIGURE 1 embodiment. In the FIGURE 6 embodiment, the width of the angled slots 44 and the thickness of the shim laminations 42 determine the cross-sectional area of the air outlets.

The formation of the manifolds 36 or 36a and manifold channels 38 or 38a in either embodiment may be easily made by a routing machine, for example. Air passages 34 or 34a are readily formed by a simple drilling operation.

The invention will now be described more specifically. For the embodiment shown in FIGURES 1–5, the lamination sections 20, 24 or 26 may be made of a variety of materials including metal or a polymeric material such as a plastic. It has been found that an aluminum alloy is a preferred material from the standpoint of durability, machinability, weight and cost. The lamination sections, for example, may be made of aluminum alloy bar stock ½ inch thick by 1 inch wide and from 8 to 12 inches in length. As best seen in FIGURES 2 and 5, the ends 48 may be bevelled to facilitate the alignment of a number of pneumatic sheet handling units in a line for conveying sheet material.

The lamination sections 20, 24 and 26 are modular in outline shape as seen in FIGURES 2 and 4, with the bolt holes 50 and air passages 34 aligned. When assembled the lamination guide edges 25 having air outlets 22 are all in register to form a substantially flat guide surface 30.

Referring now to FIGURE 5, the method of forming a lamination section 20 will be described. After the cutting of the bevelled ends 48, the manifold 36 and channels 38 are formed in one side of the lamination, for example, by a router. The manifold 36 and channels 38 are cut to a depth of about one sixteenth of an inch. The air outlet grooves 21 are then milled into portion 52 of lamination side 23 from the manifold 36 and manifold channel 38 to the guide edge 25. The bolt holes 50 and air passages 34 are drilled through a stack of aligned lamination sections to insure proper registration when assembled. Thus, a group of four lamination sections 20 with an end lamination 24 and a spacer lamination 26 may be stacked together and held in a drill jig for the drilling of bolt holes 48. End lamination section 24 may then be removed and air passage 34 can be drilled. The sections are then deburred and cleaned, ready for assembly into a pneumatic sheet handling unit.

One cross-sectional size of outlet groove which has been successfully used had a .020 inch width and a .020 inch depth thereby providing an air outlet opening having an effective cross-sectional area of .0004 of a square inch. The angle of cut for the grooves 21 may be from 10 to 30 degrees and is preferably about 20 degrees with respect to the guide edge surface 25. The air outlets 22 in guide surface 30 will be slightly elongated, due to the angular disposition of the grooves. For some applications different angles for the air outlets may also be employed.

Any desired number of laminations 20 may be employed in an air handling unit such as shown in FIGURE 1. As will be readily understood, the number and spacing of air outlet 22 is determined by the spacing between outlet grooves 21 along each lamination section in the direction of sheet movement. The lamination thickness determines the spacing between the air outlets across the moving sheet. Thus, if it is desired to space the air outlets close together vertically as seen in FIGURES 1 and 3, the laminations 20 can be reduced in thickness from ½ inch to ⅜ of an inch, for example. Depending upon the type of sheet material and the speed with which it is to be conveyed, the air outlets 22 may be spaced along each lamination at varying distances, with a distance of from ½ to 1½ inches being preferred for some applications.

As shown in FIGURES 1 and 3, the pneumatic sheet handling unit is assembled as follows. The lamination sections 20 are stacked with securable sides 23 all facing the same way and with air outlet grooves 21 positioned against the flat side 27 of the next succeeding lamination. End lamination 24 is positioned on the uppermost lamination 20, as seen in FIGURES 1 and 3, to provide an end closure. Spacer lamination 26 may be interposed between the mounting plate 54 and the first supplied lamination 20.

It should be readily understood that any number of spacer laminations 26 may be positioned adjacent the mounting plate 54 or if desired, spacer laminations may also be interposed between any of the laminations 20.

With the laminations thus stacked, bolts 28 secure the laminations together by being drawn into threaded holes 56 in the mounting plate 54. The bolts 28 thus may serve to secure the unit together and to position the secured unit firmly on the mounting plate 56. It should be understood however, that the bolts 28 may be secured into threaded holes in the spacer lamination 26 for example, and any suitable means for securing the unit to a mounting plate or structure may be employed.

With the pneumatic sheet handling unit thus assembled and air passage 34 aligned with air supply fitting 32 and its associated opening 58 in the mounting plate, an air supply tubing 60 is connected to fitting 32 to supply air from a suitable air supply source such as a compressor (not shown).

The pneumatic sheet handling units may be used in series with a group of other similar units either having straight or curved guide surfaces for moving sheet material. The lamination sections 20, 24 or 26 may also be made by molding, extruding or casting of either a plastic material or metal or metal alloy. The lamination sections may also be curved to provide a pneumatic sheet handling unit with a curved guide surface. For curved pneumatic sheet handling units, casting or molding of the blank or of the finished lamination section may be more desirable.

The lamination sections 20, 24 and 26 may be joined together by any suitable means. It should be kept in mind however, that securing the laminations together as by bolts facilitates cleaning of the units.

Referring now to FIGURES 6-11, the alternate embodiment of the invention will be described more specifically. As best shown in FIGURE 9, the lamination shims 42 may be made of brass, for example, with the width of the slots 44 and the thickness of the shim defining the size of the air outlet opening 44. Thus, to provide an air outlet of about .020 of an inch on each side merely requires a shim thickness of .020 of an inch, with the width of the slot 44 being .020 of an inch. Thus, the resulting air outlet upon assembly is .020 of an inch along each side with the exposed opening 46 on the guide surface 30a being slightly greater in the direction of sheet travel because of the angular orientation of the slot 44. The slot angle with respect to the shim edge may be from 10 to 30 degrees, with 20 degrees the preferred angle.

Lamination sections 24 and 26 may be made identical as with those for the embodiment shown in FIGURE 1. As shown in FIGURE 8, end lamination 24 closes off the end of the lamination stack and similarly, spacer lamination 26 is provided with an air passage 34a as in the FIGURE 1 embodiment.

The lamination sections 40 may be formed in substantially the same manner as in the embodiment of FIGURES 1 and 5 above, except that no air outlet slots are cut into the side portion 52a.

As shown in FIGURE 10, the lamination section 40 thus may be formed from aluminum alloy bar stock with bevelled ends 48, with main manifold 36a and manifold channels 38a cut into securable side 23a to a depth of about 1/16 of an inch. As shown in FIGURE 11, lamination shim 42 may be formed by stamping since it is comprised of very thin sheet material. Accordingly, slots 44, air passage 34b and bolt holes 51 may all be formed in a single stamping operation.

As shown in FIGURES 10 and 11, the bolt holes 50 and 51 of the laminations 40 and 42, respectively, are aligned to maintain guide surface edge 25a of lamination 40 and guide edge 25b of shim 42 substantially in register when assembled, as shown in FIGURES 7, 8 and 9. Air passages 34b in the shim 42 are also aligned for communication with the air passages 34a in the lamination sections 40 upon assembly.

As best seen in FIGURES 6-9, the unit is assembled as follows. Spacer lamination 26 and end lamination 24 are positioned at each end of the lamination stack. Shims 42 and manifold containing lamination sections 40 are alternately interposed between them, with the slots 44 of the shims overlying and communicating with the manifold 36a and channels 38a as shown in FIGURE 7. Bolts 28 secure the assembly together and are secured into threaded holes 56 in mounting plate 54. The air supply fitting 32 is supplied with air through tubing 60 to provide a plurality of spaced air outlets angularly directed from the guide surface 30a of the assembled unit. As pointed out above, the lamination sections 40, 24 or 26 and/or shims 42 of the embodiment shown in FIGURE 6, may also be made partially or wholly by molding, extrusion or casting of a plastic material or of a metal or metal alloy.

In the manufacturing of pneumatic sheet handling units of both embodiments costs have been greatly reduced in the formation of the angularly directed air outlets. Drilling and other costly methods of air outlet forming have been eliminated, greatly contributing to economy of manufacture. It has further been found that the employment of essentially identical lamination sections or shims for either embodiment provides great flexibility in the making of pneumatic sheet handling units of varying width, i.e., unit width being parallel to securing bolts 28.

Besides the substantial economies of manufacture it has been found that air waste has been largely eliminated and the pneumatic sheet handling units of my invention are very efficient in operation. The manifold system of supplying each row of air outlets from a manifold connected to a main air passage reduces leakage, since the number of air fittings is greatly reduced.

It should be understood that the terms "pneumatic" and "air" as used in the specification and claims herein also contemplates the use of any other gas or mixture of gas which may be employed with such apparatus.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. Pneumatic sheet handling apparatus comprising, in combination,
   (A) a stack of a plurality of modular laminations each having a guide surface edge;
   (B) an air manifold comprising a depression in at least one side of each of said laminations;
      (1) said opposite side forming a seal on an adjacent lamination around said manifold;
   (C) means forming a plurality of air outlet grooves in the side of each lamination having an air manifold;
      (1) from said air manifold to and through said guide surface edge of the lamination;
   (D) means forming a main air passage through each of said secured laminations and into each of said air manifolds therein;
   (E) means for securing said lamination sections together with said air passages aligned and said guide surface edges in registration to form a surface having a straight line in lateral cross section over which sheet material is moved; and
   (F) closure means for sealing off the last supplied lamination section air manifold;
whereby air may be moved under pressure through said air passages into said manifolds and then through said air outlet grooves to distribute air over the surface of a sheet.

2. Pneumatic sheet handling apparatus, comprising, in combination,
   (A) a stack of a plurality of modular lamination sections having guide surface edges;
      (1) each said lamination section having an air manifold comprising a depression in a first securable side surface thereof;
      (2) the opposite securable side being substantially flat;
   (B) means forming a plurality of grooves in said first securable side of said lamination sections;
      (1) said grooves extending from said manifold through to said guide surface edge;
   (C) means forming an air passage through said lamination sections and into each of said air manifolds;
   (D) means for securing said lamination sections together;
      (1) with the manifold in each lamination facing the flat side of the next adjacent lamination,
      (2) with their respective air passages aligned with one another, and
      (3) with said guide surface edges being in registration with each other to form a guide surface having a straight line in lateral cross section for moving a sheet thereover; and
      (4) closure means for sealing off the lamination; and
   (E) a connector securable to and in fluid communication with said air passage to connect the assembled lamination sections to an air supply;
whereby said grooves form spaced air outlet openings on the guide surface formed by said guide surface edges, said air outlet openings being supplied by air through said connector, said air passages, and said manifold.

3. Pneumatic sheet handling apparatus, comprising, in combination,
   (A) a stack of a plurality of modular lamination sections;
      (1) each said lamination section having a substantially planar guide edge and an air manifold comprising a depression in a first side surface thereof;
         (a) the opposite side surface being substantially flat;
      (2) each said lamination section having means forming grooves in said first side surface from said air manifold to an adjacent guide edge;
   (B) means forming an air passage through each of said lamination sections through each of said air manifolds;
   (C) securing means for joining said lamination sections together,
      (1) with each said manifold adjacent the flat side surface of the next adjacent lamination section;
      (2) the guide edges of said lamination sections being aligned in registration with one another to provide a substantially planar guide surface;
         (a) having air outlets formed by said grooves being secured against the flat side of the next adjacent lamination section; and
   (D) closure means for sealing off the last supplied lamination section air manifold.

4. Pneumatic sheet handling apparatus, comprising, in combination,
   (A) a plurality of lamination sections;
      (1) having opposed securable side;
      (2) and a guide surface edge;
   (B) means forming an air manifold in a securable side of at least one of said laminations;
   (C) a shim lamination for each said manifold-containing lamination section;
      (1) said shim lamination having means forming slots along an edge thereof;
   (D) means forming an air passage through said laminations to each of said manifolds;
   (E) means for securing said lamination sections and said lamination shims together into a pneumatic air handling unit;
      (1) with each lamination shim adjacent a manifold;
      (2) and with the slotted edge of each lamination shim substantially in register with said guide surface edges of said lamination sections;
whereby a guide surface is formed by the guide surface edges of the lamination sections and the slotted edges of said lamination shims, said slots forming a plurality of air outlets in said guide surface in communication with said manifolds.

5. Pneumatic sheet handling apparatus as defined in claim 4 wherein said slots are at an angle of from 10 to 30 degrees to said guide surface edges.

6. Pneumatic sheet handling apparatus, comprising, in combination,
   (A) a plurality of lamination sections;
      (1) having opposed securable sides;
      (2) and a guide surface edge;
   (B) a plurality of shim laminations;
      (1) means forming slots along one edge of said shim laminations;
   (C) means for securing said lamination section and said shim laminations together alternately;
      (1) with said guide surface edges of said lamination sections and said slotted edges of said shim laminations in register;
   (D) meaens forming an air manifold in said lamination sections adjacent said lamination shims;
      (1) said manifold being in fluid communication with said shim lamination slots;
   (E) and means forming an air passage through said assembled laminations from an outside source of air pressure to said manifolds.

7. In pneumatic sheet handling apparatus, comprising a sheet moving unit having a guide surface over which sheet material is moved, said guide surface having means forming a plurality of directed air outlets therein, the combination of,
- (A) a plurality of alternative first and second laminations forming said unit;
    - (1) said laminations having securable sides; and
    - (2) a guide surface edge;
- (B) said first lamination sections having means forming air outlet slots into their guide surface edges;
- (C) air manifold means in said second laminations for fluid communication with said air outlet slots when said laminations are secured together;
- (D) means for securing said laminations together with their guide surface edges substantially in register; and
- (E) means forming an air passage in said unit for supplying air to said air manifold means.

References Cited by the Examiner

UNITED STATES PATENTS

| | | | |
|---|---|---|---|
| 2,778,691 | 1/1957 | Hazel | 302—31 |
| 3,070,901 | 1/1963 | Allander et al. | 226—97 |
| 3,081,996 | 3/1963 | Hajos | 271—74 |
| 3,103,388 | 9/1963 | Cole | 302—31 |
| 3,136,539 | 6/1964 | Lyman | 271—26 |
| 3,182,796 | 5/1965 | Reed et al. | 209—73 |

ANDRES H. NIELSEN, *Primary Examiner.*